US010791196B2

(12) United States Patent
Bhatnagar et al.

(10) Patent No.: US 10,791,196 B2
(45) Date of Patent: Sep. 29, 2020

(54) DIRECTORY LOOKUP FOR FEDERATED MESSAGING WITH A USER FROM A DIFFERENT SECURE COMMUNICATION NETWORK

(71) Applicant: Wickr Inc., San Francisco, CA (US)

(72) Inventors: Arjun Bhatnagar, Matawan, NJ (US); Christopher Howell, Freehold, NJ (US)

(73) Assignee: Wickr Inc., Pleasanton, CA (US)

( * ) Notice: Subject to any disclaimer, the term of this patent is extended or adjusted under 35 U.S.C. 154(b) by 0 days.

(21) Appl. No.: 15/689,247

(22) Filed: Aug. 29, 2017

(65) Prior Publication Data
US 2019/0068746 A1   Feb. 28, 2019

(51) Int. Cl.
| H04L 29/08 | (2006.01) |
| H04L 12/58 | (2006.01) |
| G06F 16/182 | (2019.01) |
| H04L 29/06 | (2006.01) |
| H04L 12/18 | (2006.01) |

(52) U.S. Cl.
CPC ........ *H04L 67/306* (2013.01); *G06F 16/1837* (2019.01); *H04L 12/1822* (2013.01); *H04L 51/38* (2013.01); *H04L 63/062* (2013.01); *H04L 63/104* (2013.01); *H04L 51/04* (2013.01); *H04L 2463/062* (2013.01)

(58) Field of Classification Search
CPC ..... G06F 16/1837; H04L 51/04; H04L 51/38; H04L 67/306
See application file for complete search history.

(56) References Cited

U.S. PATENT DOCUMENTS

| 5,799,086 A | 8/1998 | Sudia |
| 6,094,485 A | 7/2000 | Weinstein et al. |
| 6,701,347 B1 | 3/2004 | Ogilvie |
| 6,931,532 B1 | 8/2005 | Davis et al. |
| 7,020,779 B1 | 3/2006 | Sutherland |
| 7,047,435 B2 | 5/2006 | Liou et al. |
| 7,139,399 B1 | 11/2006 | Zimmermann |
| 7,146,009 B2 | 12/2006 | Andivahis et al. |
| 7,185,059 B2 | 2/2007 | Daniell et al. |
| 7,321,969 B2 | 1/2008 | Schoen et al. |
| 7,395,436 B1 | 7/2008 | Nemovicher |

(Continued)

OTHER PUBLICATIONS

Nov. 21, 2006, Windl et al. The NTP FAQ, available at http://www.ntp.org/ntpfaq/NTP-a-faq.htm pp. 1-23.

(Continued)

*Primary Examiner* — Mohamed A. Wasel
(74) *Attorney, Agent, or Firm* — Banner & Witcoff, Ltd.

(57) ABSTRACT

A secure communication platform includes a user database that allows users from different secure communication networks to perform directory look-ups to access keys, and other information, for recipients outside of their network. Users from different secure communication networks may request, from the database, user information of users outside their secure communication. The user information may allow the users of different secure communication networks to exchange secure communications. The secure communication platform provides a high degree of trust regarding the sender's identity, allowing the receiving network to trust the sender, and allowing the secure communications to flow across different secure communication networks.

15 Claims, 12 Drawing Sheets

(56) References Cited

U.S. PATENT DOCUMENTS

| | | | |
|---|---|---|---|
| 7,580,521 B1 | 8/2009 | Spies et al. | |
| 7,644,268 B2 | 1/2010 | Filipi-Martin et al. | |
| 7,657,736 B2 | 2/2010 | Godfrey et al. | |
| 7,792,912 B2 | 9/2010 | Britton et al. | |
| 7,953,979 B2* | 5/2011 | Borneman | G06F 21/41 713/175 |
| 8,108,678 B1 | 1/2012 | Boyen | |
| RE43,302 E | 4/2012 | Dickinson, III et al. | |
| 8,266,421 B2 | 9/2012 | Sidman | |
| 8,625,805 B1 | 1/2014 | Statica et al. | |
| 8,819,410 B2 | 8/2014 | Sidman | |
| 8,861,540 B2* | 10/2014 | Wu | H04M 1/2473 370/420 |
| 9,477,374 B1* | 10/2016 | Snabl | G06F 3/04817 |
| 9,674,751 B2* | 6/2017 | Maguire | H04L 67/125 |
| 9,807,067 B1 | 10/2017 | Ryan et al. | |
| 10,135,776 B1* | 11/2018 | Brown | H04L 51/00 |
| 10,171,410 B2* | 1/2019 | Liden | H04L 67/303 |
| 10,284,509 B1 | 5/2019 | Son | |
| 10,289,809 B1 | 5/2019 | Hesselink | |
| 10,298,551 B1 | 5/2019 | Perlman et al. | |
| 10,454,674 B1 | 10/2019 | Bar-El et al. | |
| 2001/0050990 A1 | 12/2001 | Sudia | |
| 2002/0136335 A1 | 9/2002 | Liou et al. | |
| 2002/0136410 A1 | 9/2002 | Hanna | |
| 2002/0191797 A1 | 12/2002 | Perlman | |
| 2003/0021416 A1 | 1/2003 | Brown et al. | |
| 2003/0126215 A1 | 7/2003 | Udell et al. | |
| 2003/0131060 A1 | 7/2003 | Hartselle et al. | |
| 2004/0064693 A1 | 4/2004 | Pabla et al. | |
| 2004/0083297 A1 | 4/2004 | Gazzetta et al. | |
| 2005/0066175 A1 | 3/2005 | Perlman | |
| 2007/0100944 A1 | 5/2007 | Ford et al. | |
| 2007/0197197 A1 | 8/2007 | Minear | |
| 2008/0046745 A1 | 2/2008 | Buch et al. | |
| 2008/0130895 A1 | 6/2008 | Jueneman et al. | |
| 2008/0162637 A1* | 7/2008 | Adamczyk | H04L 51/043 709/204 |
| 2009/0092050 A1* | 4/2009 | Buch | H04L 51/12 370/236 |
| 2010/0199340 A1 | 8/2010 | Jonas et al. | |
| 2010/0262667 A1* | 10/2010 | Briand | H04L 51/066 709/206 |
| 2011/0173272 A1* | 7/2011 | Carvalho Neto | G06Q 10/107 709/206 |
| 2011/0219123 A1 | 9/2011 | Yang et al. | |
| 2012/0023334 A1 | 1/2012 | Brickell et al. | |
| 2013/0067227 A1 | 3/2013 | Derrick | |
| 2013/0238728 A1 | 9/2013 | Fleck et al. | |
| 2014/0066044 A1* | 3/2014 | Ramnani | H04W 8/24 455/418 |
| 2014/0171024 A1* | 6/2014 | Huang | H04W 4/12 455/411 |
| 2014/0258707 A1 | 9/2014 | Denny | |
| 2015/0067338 A1 | 3/2015 | Gero et al. | |
| 2015/0074407 A1 | 3/2015 | Palmeri et al. | |
| 2015/0113074 A1* | 4/2015 | Marcus | H04L 51/32 709/206 |
| 2015/0169893 A1 | 6/2015 | Desai | |
| 2015/0312233 A1* | 10/2015 | Graham | H04L 63/08 713/171 |
| 2015/0350251 A1 | 12/2015 | Brander et al. | |
| 2016/0057156 A1 | 2/2016 | Lin et al. | |
| 2016/0164816 A1 | 6/2016 | Bhagwan et al. | |
| 2016/0234151 A1 | 8/2016 | Son | |
| 2016/0277410 A1 | 9/2016 | Kalb et al. | |
| 2016/0359773 A1 | 12/2016 | Shi | |
| 2016/0366105 A1 | 12/2016 | Smith et al. | |
| 2017/0126649 A1* | 5/2017 | Votaw | G06F 16/24578 |
| 2017/0126811 A1* | 5/2017 | Picciotto | H04L 67/141 |
| 2017/0374044 A1 | 12/2017 | Alyubi | |
| 2018/0167208 A1 | 6/2018 | Le Saint et al. | |
| 2018/0375663 A1 | 12/2018 | Le Saint et al. | |
| 2019/0182041 A1 | 6/2019 | De Atley et al. | |
| 2019/0253261 A1 | 8/2019 | Gero et al. | |

OTHER PUBLICATIONS

1999, Blake-Wilson et al., Authenticated Diffie-Hellman Key Agreement Protodolsw, Springer, pp. 1-23.

Jul. 11, 2016, E. Rescorla, The Transport Layer Security (TLS) Protocol Version 1.3 Draft-ietf-tls-tls13-14, pp. 1-116.

1976, Diffie et al, "New Directions in Cryptography", Retrieved from the Internet URL "https//caislab.kaist.ac.kr/lecture/2010/spring/cs548/basic/B08.pdr", pp. 1-11, as printed.

* cited by examiner

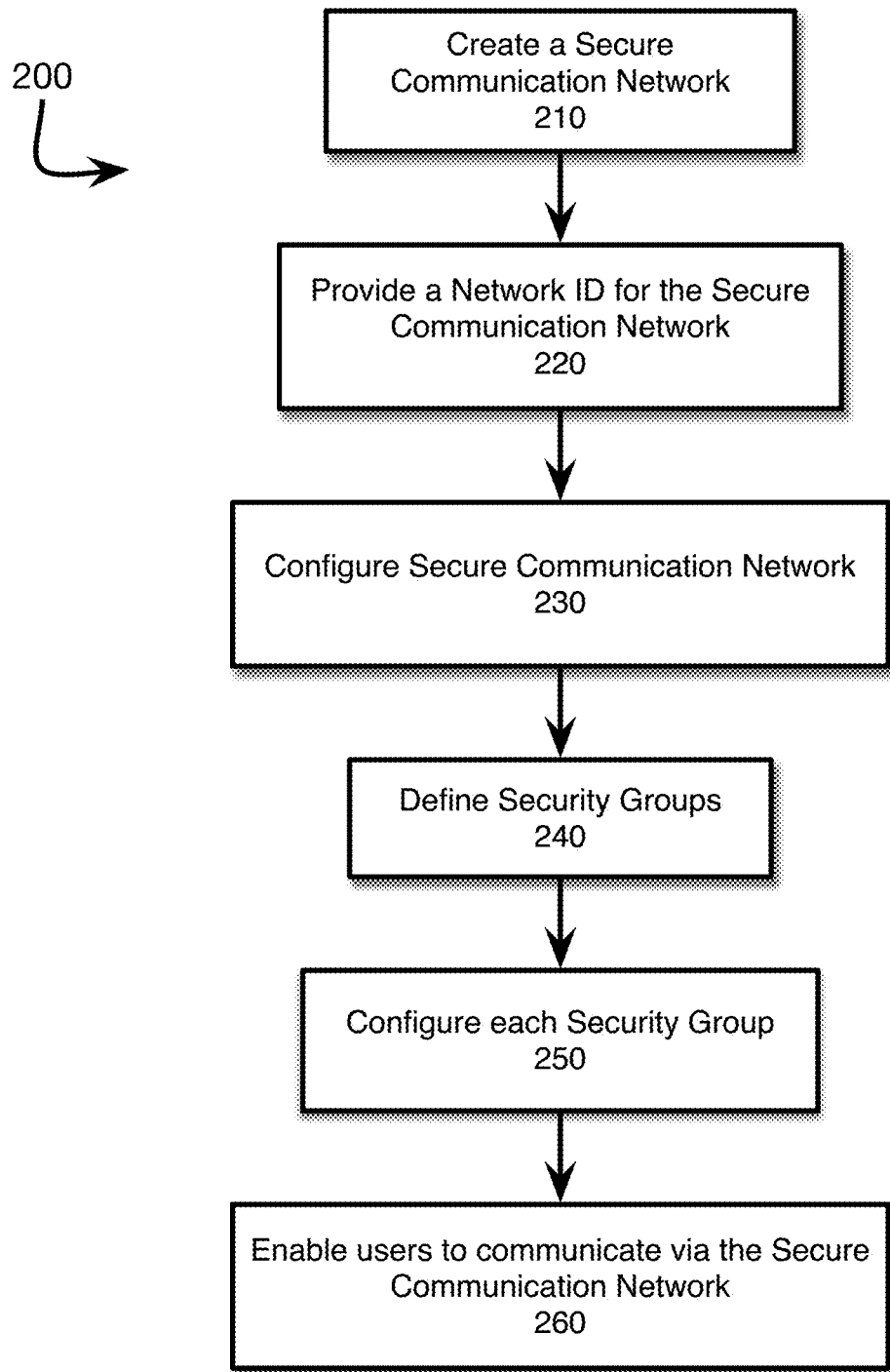

DIRECTORY LOOKUP FOR FEDERATED MESSAGING WITH A USER FROM A DIFFERENT SECURE COMMUNICATION NETWORK

CROSS-REFERENCE TO RELATED APPLICATIONS

This application is related to co-pending applications U.S. Ser. No. 15/689,239, entitled "Federated Messaging," U.S. Ser. No. 15/689,250, entitled "Transmitting an Encrypted Communication to a User in a Second Secure Communication Network," and U.S. Ser. No. 15/689,253, entitled "Receiving an Encrypted Communication from a User in a Second Secure Communication Network," all filed concurrently herewith, the entireties of which are incorporated by reference herein.

BACKGROUND OF THE INVENTION

Most corporations today provide a communication platform to their employees to send and receive instant messages, share files, and video conference. However, these communication platforms are often limited in that users are only allowed to communicate with users within their own corporation network. That is, a first user, on a first corporate network, is unable to send a communication to a second user on a second corporate network, and vice versa. Even if a communication platform allows for cross-network communication exchanges, most corporate networks block communications from outside networks because communications from external networks could introduce malware, such as viruses, spyware, adware, phishing attempts, Trojan horses, etc., into the network since the sender cannot be authenticated. Those communication platforms that do allow users to communicate with people from different networks, often do so at the expense of security. Thus, there is need to provide a communication platform that allows users from different networks to communicate securely.

BACKGROUND OF THE INVENTION

The present disclosure describes a federated messaging system that allows a first user belonging to a first secure communication network to communicate with a second user belonging to a second secure communication network.

According to one aspect of the disclosure a method for determining whether the first device and the second device are permitted to communicate is disclosed. The method includes receiving a first communication for a second device on a second secure communication network at a server. The first communication includes a first security group identifier associated with a first device and a second security group identifier associated with the second device. Next, the server uses a first set of permissions associated with the first security group identifier to determine if the first device is permitted to communicate with the second secure communication network. When the first device is permitted to communicate with the second secure communication network, the server then determines whether the second device is allowed to communicate with the first secure communication network according to a second set of permissions associated with the second security group identifier. When the first device and the second device are permitted to communicate, the server provides the first communication to the second device on the second secure communication network. However, when either the first set of permissions or the second set of permissions do not permit communications between the networks of the first device and second devices, the server discards the first communication.

In some examples, the first communication includes encrypted routing data and an encrypted payload and the server decrypts the encrypted routing data, using a private key, to obtain the first security group identifier and the second security group identifier. In further examples, the server determines whether the first device and the second device are on the same secure communication network and provides the first communication to the second device when they are.

Another aspect of the disclosure describes a system method for determining whether the first device and the second device are permitted to communicate that includes an interface, a processor, and a memory. The interface is configured to receive a first communication from a first device, on a first network, for a second device, on a second network. The first communication includes a first security group identifier associated with the first device and a second security group identifier associated with the second device. The processor is configured to determine whether a first set of permissions associated with the first security group identifier permit the first device to communicate with the second secure communication network, determine whether a second set of permissions associated with the second security group identifier permit the second device to communication with the first secure communication network, and provide the first communication to the second device on the second secure communication network when the first device and the second device are permitted to communicate with each other. The processor is also configured to discard the first communication when either the first set of permissions or the second set of permissions do not permit communications between the networks of the first device and second devices. The memory is coupled to the processor and configured to store the first set of permissions and second set of permissions and to provide the processor with instructions for determining whether the first device and the second device are permitted to communicate.

In some aspects of the disclosure, the first communication includes encrypted routing data and an encrypted payload and the processor is configured to decrypt the encrypted routing data using a first key, such as a private key, to obtain the first security group identifier and the second security group identifier. Another example describes that the processor is configured to determine whether the first network and the second network are the same network and provide the first communication to the second device when they are.

According to another aspect of the disclosure, a non-transitory computer-readable medium that includes instructions for determining whether the first device and the second device are permitted to communicate is disclosed. The instructions include receiving a first communication for a second device on a second secure communication network at a server. The first communication includes a first security group identifier associated with a first device and a second security group identifier associated with the second device. Next, the instructions determine whether the first device is permitted to communicate with the second secure communication network using a first set of permissions associated with the first security group identifier. When the first device is permitted to communicate with the second secure communication network, the instructions then determine whether the second device is allowed to communicate with the first secure communication network according to a second set of permissions associated with the second security group identifier. When the first device and the second device are permitted to communicate, the instructions provide the first communication to the second device on the second secure communication network. However, when either the first set of permissions or the second set of permissions do not permit communications between the networks of the first device and second devices, the instructions discards the first communication.

In some examples, the first communication includes encrypted routing data and an encrypted payload and the instructions include decrypting the encrypted routing data, using a private key, to obtain the first security group identifier and the second security group identifier. In further examples, the instructions determine whether the first device and the second device are on the same secure communication network and provide the first communication to the second device when they are.

Another example of the disclosure describes a method for performing a directory lookup to determine if a first user in a first secure communication network can communication with a second user in a second secure communication network. The method includes receiving, at a server, a first identifier, such as a phone number, an email address, and a native identifier, for a second user belonging to a second network from a first device belonging to a first network. Next, the server determines whether the first device is permitted to communicate with the second network. When the first device is permitted to communicate with the second network, the server determines whether the second user is permitted communicate with the first secure communication network. The first server provides profile information of the second user to the first user device when the second user is permitted to communicate with the first network.

In some examples, the first device is associated with a first security group identifier which is used to determine whether the first device is permitted to communicate with the second network. This determination includes determining whether a first set of permissions associated with the first security group identifier allows the first device to communicate with the second secure communication network. Similarly, the second user is associated with a second security group identifier that is used to determine whether the second user is permitted to communicate with the first secure communication network. This determination includes determining whether a second set of permissions associated with the second security group identifier allows the second user to communicate with the first secure communication network. If these determinations fail and the first device is not permitted to communicate with the second network, the server provides an indication to the first device that the second user is unavailable. A similar indication may be provided when the first device is not permitted to communicate with the second communication network.

An additional example of the disclosure describes a system that includes an interface, a processor and a memory. The interface is configured to receive a first identifier for a second user belonging to a second secure communication network from a first device belonging to a first secure communication network. The processor is configured to determine whether the first device is permitted to communicate with the second secure communication network, determine whether the second user is permitted to communicate with the first secure communication network, and provide profile information of the second user to the first device when the first device and the second user are permitted to communicate. When the first device or second device are not permitted to communicate with the other's network, the processor provides an indication to the first device that the second user is unavailable. The memory is coupled to the processor and configured to provide the processor with instructions for determining whether to provide the second user's profile to the first device.

In these examples, the first device is associated with a first security group identifier that is used to determine whether a first set of permissions associated with the first security group identifier permits the first device to transmit communications to the second secure communication network. Like the first device, the second device is also associated with a second security group identifier and the processor is configured to determine whether a second set of permissions associated with the second security group identifier permits the second device to receive communications from the first secure communication network.

Another aspect of the disclosure provides for a non-transitory computer-readable medium comprising instructions that when, executed by at least one processor, perform a directory lookup. The instructions include receiving, at a server from a first device belonging to a first network, a first identifier for a second user belonging to a second secure communication network. Next, the instructions determine whether the first device is permitted to communicate with the second secure communication network. When the first device is permitted to communicate with the second communication network, the instructions determine whether the second user is permitted to receive communications from the first secure communication network. When the second user is permitted to communicate with the first communication network, the instructions provide profile information of the second user to the first device. However, when either user is not allowed to communicate with the other's network, the instructions provide an indication to the first device that the second user is unavailable.

As with previous examples, the first device is associated with a first security group identifier, and the instructions determine whether a first set of permissions associated with the first security group identifier permits the first device to communicate with the second secure communication network. Additionally, the second user is associated with a second security group identifier which the instructions use to determine whether a second set of permissions associated with the second security group identifier permits the second device to receive communications from the first secure communication network.

Another aspect of the disclosure provides for method for transmitting a federated message. The method includes a first device transmitting a first identifier for a second user that belongs to a second secure communication network to a secure communication platform. The first device receives a response from the secure communication platform that includes a user profile. The user profile includes at least one of a first security group identifier, a first network identifier, a first ephemeral public key, and a first key identifier. Next, the first device generates a first encryption key, derives a key-encrypting key using at least the first ephemeral public key, and then encrypts a first communication to the first user using the first encryption key and the first encryption key using the key-encrypting key. The first device then transmits the first encrypted communication, the key identifier, and the encrypted first encryption key to the second user on the second secure communication network.

In preferred examples, the first device belongs to a first secure communication network and the first secure communication network and the second secure communication network are different networks. The first encryption key is calculated by inputting a first set of pseudorandom bytes into a key derivation function. Further, the first device generates a second ephemeral key pair to derive the key-encrypting key according to a key agreement protocol. For example, the key agreement protocol uses the first ephemeral public key and the second ephemeral private key generated by the first device. Accordingly, the second ephemeral public key is transmitted to the first user with the first encrypted communication, the key identifier, and the encrypted first encryption key.

One example of the present disclosure describes a system that includes an interface, a processor, and a memory. The interface is configured to transmit a first identifier for a second user that belongs to a second secure communication network to a secure communication platform and receive response from the secure communication platform that includes a user profile for the second user. The user profile includes at least one of a first security group identifier, a first network identifier, a first ephemeral public key, and a first key identifier. The processor is configured to generate a first encryption key, derive a key-encrypting key using at least the first ephemeral public key, encrypt a first communication to the first user using the first encryption key, encrypt the first encryption key using the key-encrypting key; and transmit the first encrypted communication, the key identifier, and the encrypted first encryption key to the second user on the second secure communication network. The memory is coupled to the processor and configured to provide the processor with instructions for generating the first encryption key, deriving the key-encrypting key, encrypting the first communication, and encrypting the first encryption key.

In the example described above, the first device belongs to a first secure communication network and the first secure communication network and the second secure communication network are different networks. Additionally, the processor may be configured to generate a second ephemeral key pair. The second ephemeral private key is used to generate the key-encrypting key along with the first ephemeral public key. Accordingly, the processor is configured to transmit the second ephemeral public key to the first user with the first encrypted communication, the key identifier, and the encrypted first encryption key.

Another example of the present disclosure provide for a non-transitory computer-readable medium comprising instructions that when, executed by at least one processor, transmit an encrypted communication to a user of a different secure network. The instructions include transmitting a first identifier for a second user to a secure communication platform. The instructions receive a response from the secure communication platform that includes the user profile for the second user. The user profile includes at least a first security group identifier, a first network identifier, a first ephemeral public key, and a first key identifier. The instructions generate a first encryption key, derive a key-encrypting key using at least the first ephemeral public key, and encrypting a first communication using the first encryption key and the first encryption key using the key-encrypting key. The instructions transmit the first encrypted communication, the key identifier, and the encrypted first encryption key to the second user on the second secure communication network.

In further examples, the first device belongs to a first secure communication network and the first secure communication network and the second secure communication network are different networks. In some examples, the instructions calculate the first encryption key by inputting a first set of pseudorandom bytes into a key derivation function. Additionally, the instructions generate a second ephemeral key pair, and the second ephemeral private key, along with the first ephemeral public key, is used to generate the key-encrypting key. The instructions transmit the second ephemeral public key to the first user with the first encrypted communication, the key identifier, and the encrypted first encryption key.

Another example of the disclosure describes a method for receiving encrypted communications from a user in a different network. The method includes a first device receiving a first encrypted communication from a second device. Next, the first device decrypts the first encrypted communication received from the second device and provides the first decrypted communication to a user of the first device. In order to decrypt the communication, the first device derives a key-encrypting key using at least one ephemeral key, decrypts a first encrypted communication encryption key using the derived key-encrypting key, and decrypts the first encrypted communication using the first decrypted communication encryption key.

In some examples, the first encrypted communication includes a time-to-live value that is used to calculate an expiry time of the first encrypted communication. The first device determines whether a current time is greater than the expiry time. Determining the current time includes requesting a master clock time from a server, receiving the master clock time and comparing the master clock time to the local device time. When the current time is greater than the expiry time, the first device revokes the first user's access to the first communication by either deleting the first communication from the first device or revoking one or more keys required to access the first communication.

One example of the disclosure provides for a system for receiving an encrypted communication from a user of a different network. The system includes an interface configured to receive the encrypted communication from a second device. The system also includes a processor that is configured to decrypt the first encrypted communication received from the second device and provide the first decrypted communication to a user of the device. The system has a memory coupled to the processor that is configured to provide the processor with instructions for decrypting and providing the first communication to the user. In some examples, the processor is configured to derive a key-encrypting key using at least one ephemeral key, decrypt a first encrypted communication encryption key using the derived key-encrypting key, and decrypt the first encrypted communication using the first decrypted communication encryption key.

Another example has the processor configured to determine whether a time-to-live value associated with the first encrypted communication has expired. The processor determines an expiry time of the encrypted communication based in part on the time-to-live value. In this regard, the processor is configured to determine whether a current time is greater than the expiry time by requesting a master clock time from a server and receiving a response that includes the master clock time. The processor compares the received master clock time to a local device time to determine the current time. When the current time is greater than the expiry time, the processor revokes the user's access to the first communication by either deleting the first communication from first device or revoking one or more keys required to access the first communication.

Another example of the disclosure describes a non-transitory computer-readable medium that includes instructions for receiving encrypted communications from a user in a different network. The instructions include receiving a first encrypted communication from a second device. Next, the instructions decrypt the first encrypted communication received from the second device and provide the first decrypted communication to a user of the first device. In order to decrypt the communication, the instructions derive a key-encrypting key using at least one ephemeral key, decrypt a first encrypted communication encryption key using the derived key-encrypting key, and decrypt the first encrypted communication using the first decrypted communication encryption key.

In some examples, the first encrypted communication includes a time-to-live value that is used to calculate an expiry time of the first encrypted communication. The first device whether a current time is greater than the expiry time. Determining the current time includes requesting a master clock time from a server, receiving the master clock time and comparing the master clock time to the local device time. When the current time is greater than the expiry time, the instructions revoke the first user's access to the first communication by either deleting the first communication from the first device or revoking one or more keys required to access the first communication.

BRIEF DESCRIPTION OF THE DRAWINGS

Various examples of the invention are disclosed in the following detailed description and the accompanying drawings.

FIG. 2 shows a process for creating a secure communication network according to an example of the present disclosure.

DETAILED DESCRIPTION

Figure 1A:
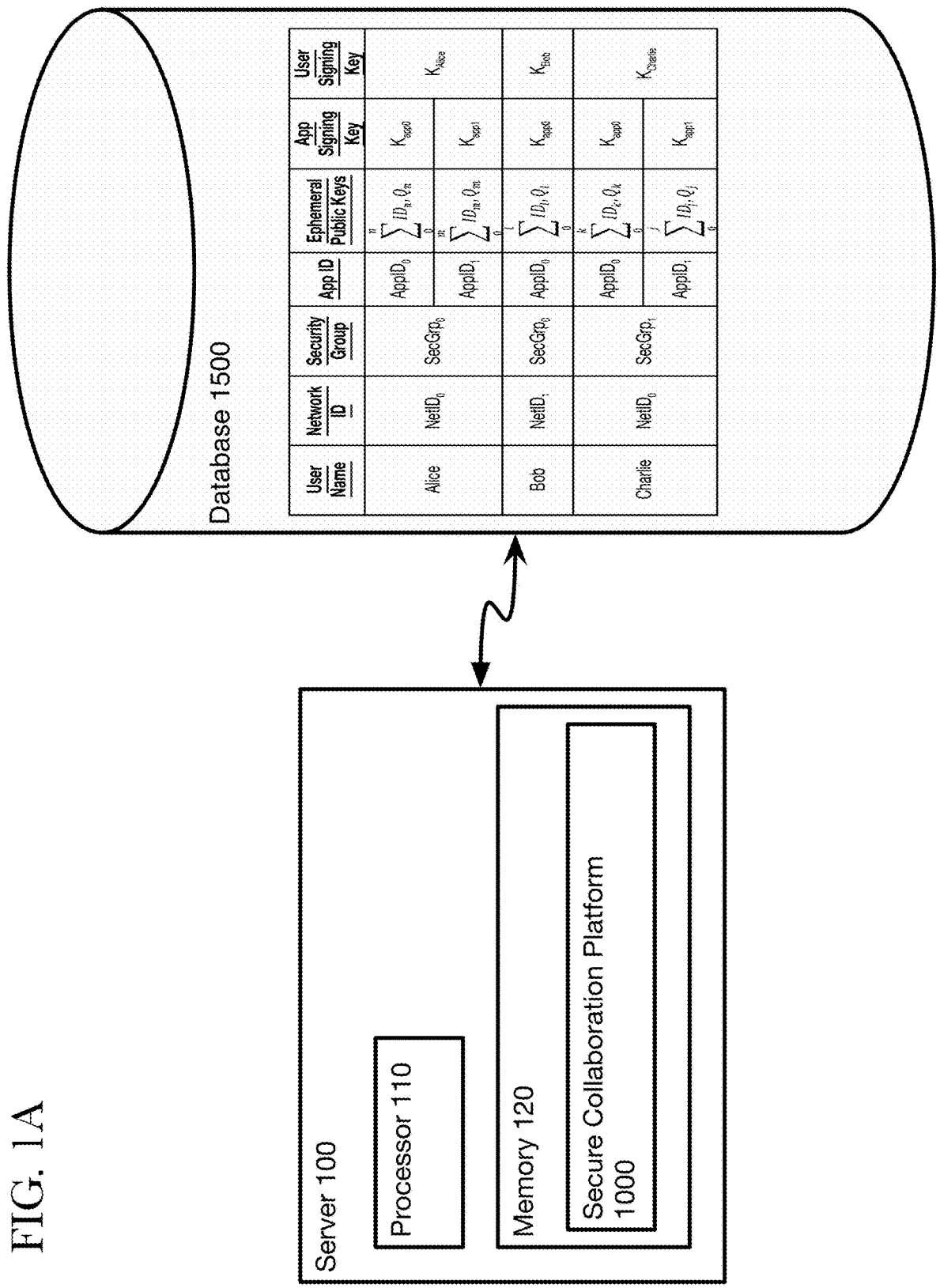
FIGS. 1A and 1B illustrates a secure communication platform according to one

The present disclosure describes a system, a method, and a non-transitory computer readable medium that includes instructions for permitting users of different secure communication networks to exchange encrypted communications. As noted above, prior art communication platforms would not permit users from different networks to communicate securely. In this regard, the technical problems arise when a sender attempts to provide a recipient with an encryption key used to encrypt the communication. Specifically, a sender could not provide the encryption key in a plaintext message, since any unauthorized user who intercepted the plaintext message containing the encryption key would be able to decrypt the communication, defeating the purpose of the encryption. Alternative methods for distributing an encryption key, such as encrypting it with a key obtained from a key distribution center or a key derived according to a key agreement protocol, suffer from vulnerabilities, as well. Namely, there is no way to authenticate the person providing the key and state-actors have been known to pre-calculate the most commonly used keys in key agreement protocols. Thus, key distribution and authenticating a sender represent technical problems in enabling a first user, on a first communication network, to transmit and receive encrypted communications from a second user, on a second communication network.

To address the technical problems in the art, the present disclosure provides a secure communication platform that includes a unified user database. The unified user database allows the secure communication platform to provide recipients' keys to senders outside of the recipients' networks. Moreover, only authorized users may access the unified user database. Therefore, the receiving network has a high degree of assurance regarding of sender's identity.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more examples of the present disclosure is provided below along with accompanying figures that illustrate the principles of the present disclosure. The present disclosure is described in connection with such examples, but the present disclosure is not limited to any example. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 1B:
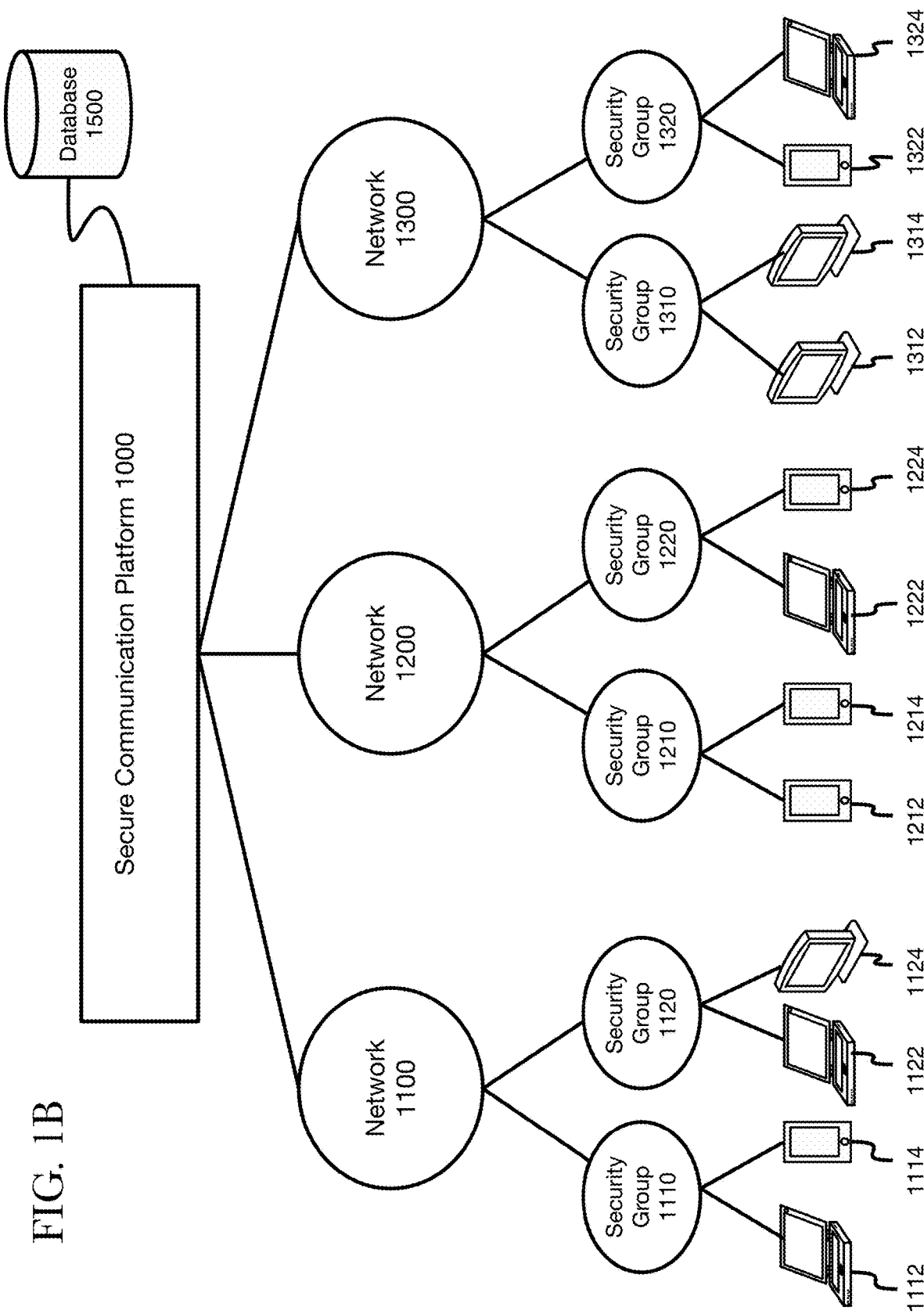

The present disclosure describes a secure communication platform that permits a first user, belonging to a first secure communication network, to send encrypted communications to a second user, belonging to second secure communication network that is separate and distinct from the first secure communication network. FIGS. 1A and 1B illustrate examples of the secure communication platform and the logical hierarchy of maintaining a plurality of secure communication networks, respectively, that enable the first user and the second user to exchange encrypted communications. As used herein, "communications" and "messages" may be used interchangeably to describe a variety of interactions, including: text messages, chat room messages, control messages, commands, e-mails, documents, audiovisual files, Short Message Service messages (SMSes), audio calls, voice calls (i.e., VOIP), and video calls. The exchange of messages and/or communications is explained in further detail below.

FIG. 1A shows a server 100, that includes processor 110 and memory 120, connected to unified user database 1500. FIG. 1A also shows secure communication platform 1000 located in memory 120.

Server 100 may be a stand-alone server, a corporate server, a virtual machine, a server located in a server farm or cloud-computing environment, or any combination thereof. In some examples, the server 100 may be a cloud service provider running one or more virtual machines configured to provide secure communication platform 1000 to one or more enterprises. As used herein, enterprises may include companies, corporations, partnerships, firms, organizations, and universities, and the secure communication platform may provide a secure communication application to one or more users of the one or more enterprises. According to some examples, the secure communication platform to the one or more enterprises as a Software as a Service (SaaS). In other examples, the secure communication platform may be provided to companies as an on-premise solution that is installed and maintained by the company's IT staff on servers or cloud computing devices operated by the company. In these examples, the secure communication platform 1000 and an enterprise user database (not shown) would be maintained on the enterprise's servers. In order to enable federated messaging (as defined below), the enterprise user database may be replicated to the unified user database maintained at the secure communication platform. Alternatively, the unified user database may be in communication with the enterprise user database. Accordingly, the enterprise user database would perform key management and the unified user database may perform as a pass through—providing the requesting user with the requested user's profile information.

Processor 110 may be any conventional processor capable of interacting with memory 120 and executing secure communication platform 1000. In this regard, processor 110 may include at least one processor, multiprocessor, multicore processor, or any combination thereof. Alternatively, processor 110 may be a dedicated controller, such as an Application Specific Integrated Circuit (ASIC) or Field Programmable Gate Array (FPGA). Processor 110 may perform a plurality of tasks on behalf of secure communication platform 1000, such as determining whether a first user and a second user are permitted to communicate, routing encrypted communications between users, and performing directory lookups. Furthermore, whenever secure communication platform 1000 is described as performing a task, either a single component or a subset of components or all components of secure communication platform 1000 or server 100 may cooperate to perform the task.

Memory 120 stores information accessible by processor 110, including instructions and data that may be executed or otherwise used by the processor 110. Memory 120 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 120 may include short term or temporary storage as well as long term or persistent storage. According to some embodiments, memory 120 may include a storage area network (SAN) accessible by the processor 110.

Secure communication platform 1000 may be configured to facilitate the exchange of communications for users of a secure communication application. The secure communication application may be obtained from a website, an internal enterprise computer, or a third-party distributor, such as Google® Play or the Apple® App Store. Once a user has obtained the secure communication application, the user will be able to send and receive encrypted communications with other users of the secure communication platform as discussed in greater detail below. In addition to facilitating the exchange of encrypted communications, secure communication platform 1000 may perform additional functions to enforce security and restrictions on the encrypted communications. For example, secure communication platform 1000 make available a master clock time available to enforce a time-to-live (TTL) value. The TTL values can be used to enforce time constraints on how long a recipient can access an encrypted communication received from the sender.

Secure communication platform 1000 may access unified user database 1500. Unified user database 1500 may be a relational database that stores information in a variety of tables. Alternatively, unified user database 1500 may be a Storage Area Network (SAN) accessible by the secure communication platform 1000. In this regard, unified user database 1500 may include a record for each user of secure communication platform 1000, including each user on every secure communication network. By maintaining all users in a single, unified database, a first user on a first secure communication network may be able to search and find a second user on a second secure communication network. Accordingly, unified user database 1500 may include an entry for each user. The entry may include a username, a network identifier (network ID), a security group identifier, an application identifier (app ID), a plurality of ephemeral public keys, an application public signing key, and a user public signing key. In some examples, a user may have the secure communication application installed on multiple devices, such as a first instance on a mobile device and a second instance on a desktop device. Accordingly, the user's entry in unified user database 1500 will include a first application identifier, a first plurality of ephemeral public keys, and a first application public signing key for the first instance of the secure communication application and a second application identifier, a second plurality of ephemeral public keys, and a second application public signing key for the second instance of the secure communication application. The username, network identifier, security group, and user public signing key will be the same for both the first instance and the second instance of the secure communication application. Additionally, unified user database 1500 may include a table of communications (not shown). That is, the secure communication platform may store communications for a predetermined time in unified user database 1500. For example, when a communication is received, the secure communication platform may store the communication in the table of communications and provide an alert, such as a push notification, to the recipient. Accordingly, a recipient may access the secure communication platform to obtain his or her stored communications. In some examples, communications may be stored for a predetermined amount of time, such as 30 days; however, this may be adjusted, as needed, based on industry standards and/or to comply with regulatory schemes.

As noted above, secure communication platform 1000 may support a plurality of secure communication networks. As used herein, a secure communication network is a logical network that provides a service to an enterprise. The service includes a secure communication application that allows users to exchange encrypted communications, encrypted files, and collaborate securely. FIG. 1B illustrates an example of a logical hierarchy of secure communication platform 1000 supporting a plurality of secure communication networks.

As shown in FIG. 1B, secure communication platform 1000 includes a first secure communication network 1100, a second secure communication network 1200, and a third secure communication network 1300. While only three secure communication networks are shown, secure communication platform 1000 may include any number of secure communication networks. In preferred examples, each secure communication network is associated with a different enterprise. For example, first secure communication network 1100 may be a communication platform for a first enterprise, second secure communication network 1200 may be a communication platform for a second enterprise, and third secure communication network 1300 may be a communication platform for a third enterprise.

First secure communication network 1100 includes first security group 1110 and second security group 1120. First security group 1110 and second security group 1120 may correspond to organizations or teams within the enterprise that configured first secure communication network 1100. Alternatively, first security group 1110 and second security group 1120 may be configured by an administrator of first secure communication network 1100. In this regard, first secure communication network may have more security groups than first security group 1110 and second security group 1120.

As illustrated in FIG. 1B, first security group 1110 includes first device 1112 and second device 1114. Similarly, second security group 1120 includes third device 1122 and fourth device 1124. First device 1112, second device 1114, third device 1122, and fourth device 1124 may make use of the secure communication platform 1000 and the techniques described herein via first secure communication network 1100 and a secure communication application installed on each of the devices. First device 1112, second device 1114, third device 1122, and fourth device 1124 may be mobile devices, such as a laptops, smart phones, or tablets, or computing devices, such as desktop computers or servers. As noted above, the secure communication application described herein allows cross-platform communications, thereby allowing users of various devices to communicate seamlessly. For example, a first user on an iPhone® may transmit an encrypted communication to a second user on an Android® device. Further, each user may have different instances of the secure communication application installed on multiple devices. That is, the user of first device 1112 may be able to receive messages on both device 1112 as well as on any other devices that the user may have that includes a copy of the secure communication application, such as a laptop. In some embodiments, first device 1112 and second device 1114 may be a user's personal device (i.e. a bring your own device (BYOD) scenario) and an enterprise asset, respectively. Because security groups may correspond to organizations or teams within an enterprise, first security group 1110 and second security group 1120 may include more than first device 1112, second device 1114, third device 1122, and fourth device 1124.

Second secure communication network 1200 and third secure communication network 1300 may be similar to first secure communication network 1100. For example, second secure communication network 1200 includes third security group 1210 with fifth device 1212 and sixth device 1214 and fourth security group 1220 with seventh device 1222 and eighth device 1224. Third secure communication 1300 includes fifth security group 1310 and sixth security group 1320. Ninth device 1312 and tenth device 1314 may be assigned to fifth security group 1310, while eleventh device 1322 and twelfth device 1324 may be assigned to sixth security group 1320. Like with first security group 1110 and second security group 1220, third security group 1210, fourth security group 1220, fifth security group 1310, and sixth security group 1320 may correspond to organizations or teams within the enterprise or be configured by an administrator. Similarly, fifth device 1212, sixth device 1214, seventh device 1222, eighth device 1224, ninth device 1312, tenth device 1314, eleventh device 1322, and twelfth device 1324 may be any of the devices described above with respect to first device 1112, second device 1114, third device 1122, and fourth device 1124. Further, a skilled artisan would recognize that the number of security groups and devices are merely illustrative and that secure communication networks may contain any number of security groups, and each security group may include any number of devices.

FIG. 1B also shows unified user database 1500 in communication with secure communication platform 1000. In this regard, unified user database 1500 maintains user information for each user of secure communication platform 1000. That is, unified user database 1500 includes user information for every user of first secure communication network 1100, second secure communication network 1200, and third secure communication network 1300. In preferred examples, the user information maintained in unified user database is encrypted. Because unified user database 1500 stores user information for each user of the secure communication platform, a first user of first device 1112 may contact the secure communication platform 1000 for user information for a second user of third device 1212. In this example, the first user may obtain profile information from unified user database 1500 for the second user because both the first user and the second user are in the same secure communication network. Moreover, a user's ability to access user information from unified user database 1500 provides a solution to the technical problem of being unable to send encrypted communications from a first secure communication network to a second secure communication network. In this regard, unified user database 1500 may act as a central repository to provide a first user device on a first secure communication network with information that allows the first user device to transmit an encrypted communication to a second user on a second secure communication network. Furthermore, the second secure communication network has a high-level of assurance that the encrypted communication can be trusted since the sender is using the secure communication application associated with the secure communication platform 1000 and, therefore, has been verified by secure communication platform 1000.

To make use of the secure communication platform, a user must first provision a secure communication network for his or her enterprise. FIG. 2 shows a process 200 for provisioning a secure communications network.

Process 200 begins in block 210 when a secure communication network is created. A secure communication network is created when a user registers with secure communication platform 1000. In preferred examples, an administrator, or another authorized user, may contact secure communication platform and complete a registration process to create the secure communication network for the enterprise. Once the registration process is complete, secure communication platform creates the secure communication network. Creation of the secure communication network includes generating a network identifier ("network ID"). According to some examples, the network identifier may be the name of the enterprise or some other information entered by the user during the registration process. Alternatively, the network identifier may be a random identifier generated by secure communication platform. In block 220, the network identifier may be provided to the user for his or her records. Additionally, the network identifier may be stored in unified user database 1500.

In block 230, the newly created secure communication network may be configured. Configuring the secure communication network may include importing user information. For example, the administrator may import user information from a directory service, such as LDAP or active directory. Additionally, configuring the secure communication network may include defining whether users of the secure communication network may receive communications from other secure communication networks. That is, a user may configure whether users of the secure communication network are able to receive communications from users outside their secure communication network. According to some examples, configuring the secure communication may include defining a time-to-live (TTL) value and enabling a burn-on-read (BOR) feature for communications. As noted above, the TTL value defines how long a recipient may access a communication. In some examples, the TTL value may be set by a sender at the time a communication is sent. In other examples, however, an administrator may set a maximum or minimum limit on the TTL value for all communications on the secure communication network. Alternatively, the administrator may define the TTL value for all communications, removing a sender's ability to control how long a recipient has access to a received communication. The BOR feature may be enabled by an administrator during configuration of the secure communication network. By enabling the BOR feature, a sender may define that access to a communication will be revoked after the recipient has read the communication. If the administrator disables the BOR feature, senders will not have this option.

In block 240, one or more security groups may be defined. By default, the secure communication network includes one security group. However, additional security groups may be defined by the user, either during registration or some time thereafter. For example, security groups may be defined by department, permissions, access control lists, teams, or projects. Once security groups have been defined, each security group may be configured in block 250. Configuring each security group may also include defining the TTL value and enabling/disabling the BOR feature. Additionally, configuring a security group may include defining whether the security group is federated. Federated, in this context, means a security group's ability to communicate with users in different secure communication networks. Federated messaging may be disabled, restricted or enabled. Disabled, in this sense, means that users would only be allowed to communicate with other users in their secure communication network. Restricted would restrict which secure communication networks users could send to and receive from. For example, a user in a security group with restricted federation may be able to receive from and transmit to first and second secure communication network, but the user may not be able to send or receive any communications from a third secure communication network. In another example of restricted federation, the user may be able to send to and receive from a first secure communication network, but not to second and third secure communication networks. When federated messaging is enabled, users are permitted to send to and receive from any secure communication network.

If the secure communication network and security groups are not defined by the administrator at the time the secure communication network is created, then default values may be used. For example, a maximum TTL value of 30 days, BOR off, and disabled federated messaging may be the default values for a secure communication network. The administrator may change these values at any time after the secure communication network has been created.

After the secure communication network and security groups are defined, enterprise users may be enabled to communicate via the newly configured secure communication network in block 260. This may include providing the enterprise users with an email, or other communication, inviting them to download the secure communication application. In some examples, enabling enterprise users may include sending them a code to enter when registering the secure communication application on their device. This code may be used by the secure communication platform 1000 to associate the user with a specific secure communication network.

Figure 3:
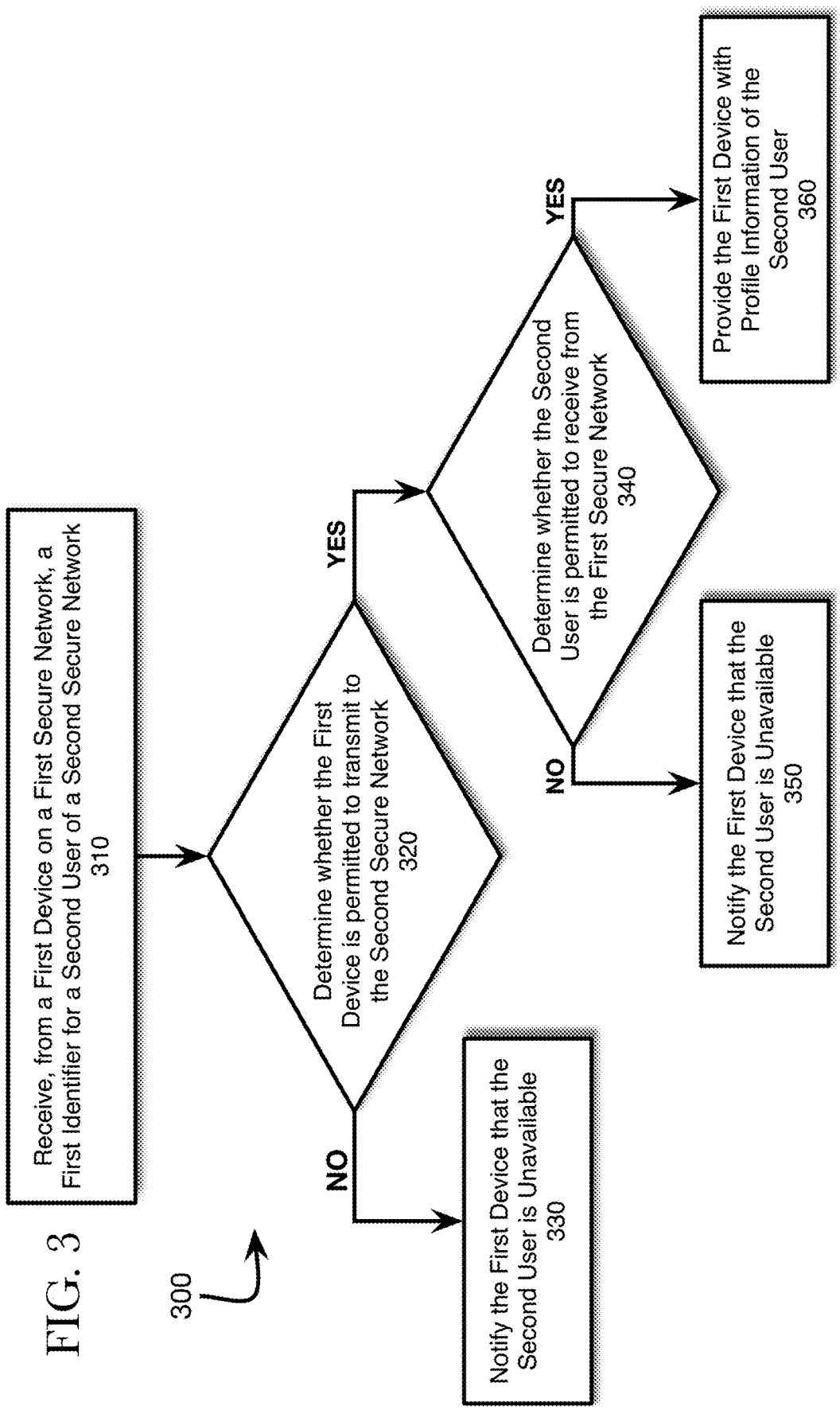
FIG. 3 illustrates a process for performing a directory search for a user of a second secure communication network.

Once enterprise users have downloaded the secure communication application, they may begin exchanging encrypted communications with other users. As noted above, exchanging encrypted communications may include sending and receiving encrypted communications with users outside of the user's secure communication network. In order to exchange encrypted communications with a user outside their secure communication network, a user may perform a directory lookup on the secure communication platform. In turn, the secure communication platform may determine whether the sending user is able to send encrypted communications off their secure communication network and whether the receiving user is able to receive encrypted communications from users external to their secure communication network. FIG. 3 shows an exemplary process 300 for performing a directory lookup on a user from a different secure communication network.

In block 310, the secure communication platform 1000 receives a first identifier for a second user of a second secure communication network from a first device on a first secure communication network. According to this example, the first secure communication network and second secure communication network are distinct networks that are logically separated from each other. The first identifier may be an email address, phone number, or username of the second user. In block 320, secure communication platform 1000 determines whether the first device is permitted to transmit to the second secure communication network. In preferred examples, determining whether the first device is permitted to communicate with users from the second secure communication network includes checking a first set of permissions associated with the sender's security group. In this regard, secure communication platform 1000 may review the first set of permissions to determine whether the sender's security group is permitted to communicate with users from the second secure communication network. If the first set of permissions do not allow the sender to transmit encrypted communications to the second secure communication network, the process 300 proceeds to block 330, where secure communication platform 1000 notifies the first device that the second user is unavailable.

On the other hand, when the first set of permissions indicate that the sender is allowed to transmit encrypted communications to the second secure communication network, process 300 proceeds to block 340. In block 340, secure communication platform 1000 determines whether the second user is permitted to receive encrypted communications from the first secure communication network. Determining whether the second user is permitted to receive from the first secure communication network may include checking a second set of permissions associated with the second user's security group to determine whether the second user's security group is permitted to communicate with users from the first secure communication network. If the second set of permissions do not allow the second user to communicate with users from the first secure communication network, the process 300 proceeds to block 350, where secure communication platform 1000 notifies the first device that the second user is unavailable.

However, when the second set of permissions indicate that the second user is able to communicate with users from the first secure communication network, process 300 proceeds to block 360. In block 360, secure communication platform 1000 provides the first device with profile information of the second user. Receiving the second user's profile information may occur in the background of the first device, and the secure communication application may open a window that allows the user of the first device to proceed with composing an encrypted communication to the second user.

Figure 4:
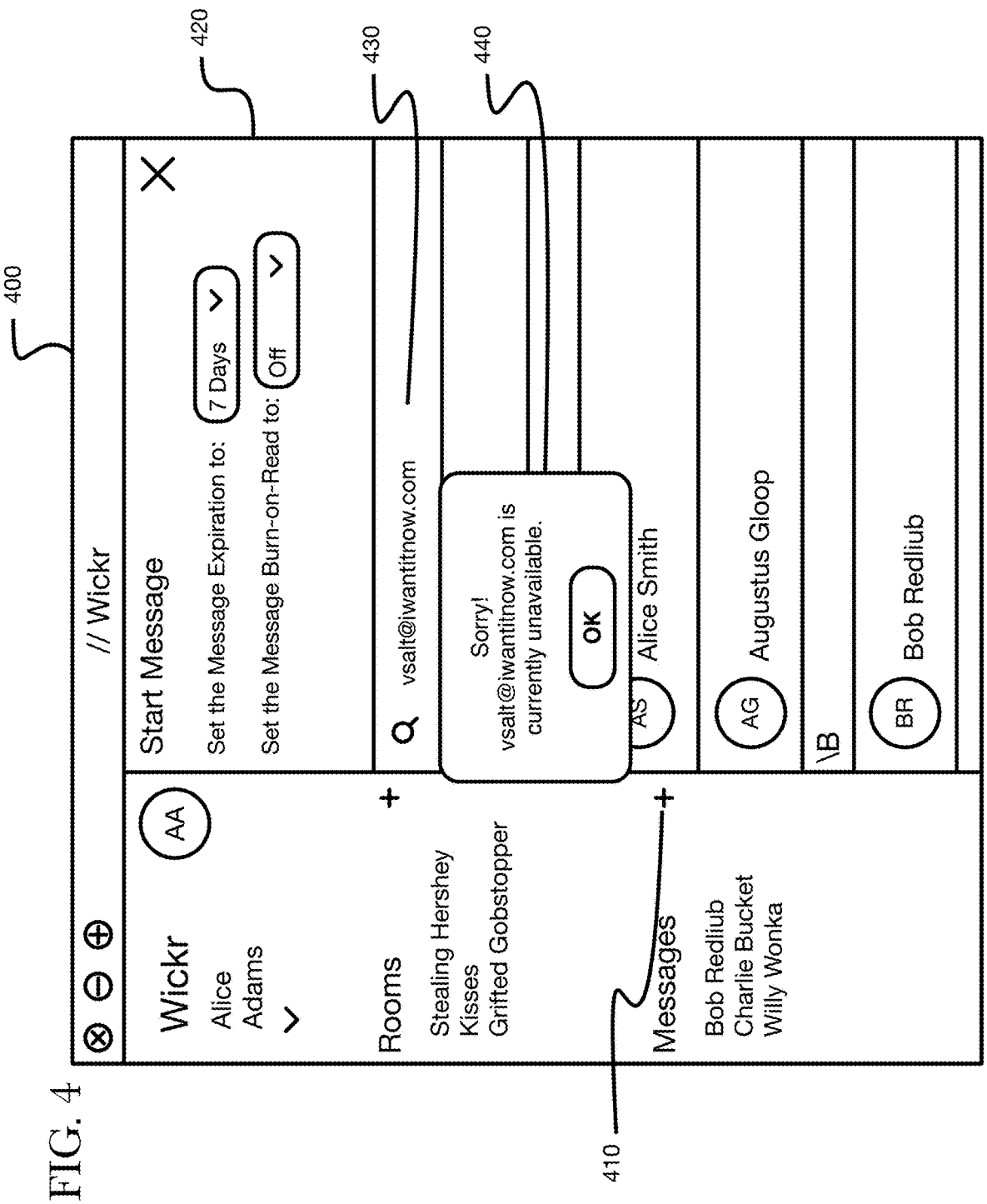
FIG. 4 shows an example of an interface for performing a directory search.

Turning to FIG. 4, an example of an interface 400 for performing a directory lookup is shown. Interface 400 includes an icon 410 for initiating a new communication to a second user. In response to a first user selecting icon 410, a "Start Message" window 420 may be displayed. Window 420 may include a variety of options, such as setting a TTL value for the communication or enabling the BOR feature. Additionally, window 420 may have a directory that the user can search through to select another person with which to communicate. Window 420 may also include a search field 430, where the first identifier may be entered to search for users of different secure communication networks. As noted above, window 420 may change into a message composition interface (illustrated below) when the user is permitted to communicate with a second user. However, if either user is unable to communicate with someone external to their secure communication network, an additional window 440 may be displayed indicating that the second user is unavailable. Additional information may be conveyed in window 440. For example, window 440 may indicate which user does not have the requisite permissions.

Figure 5A:
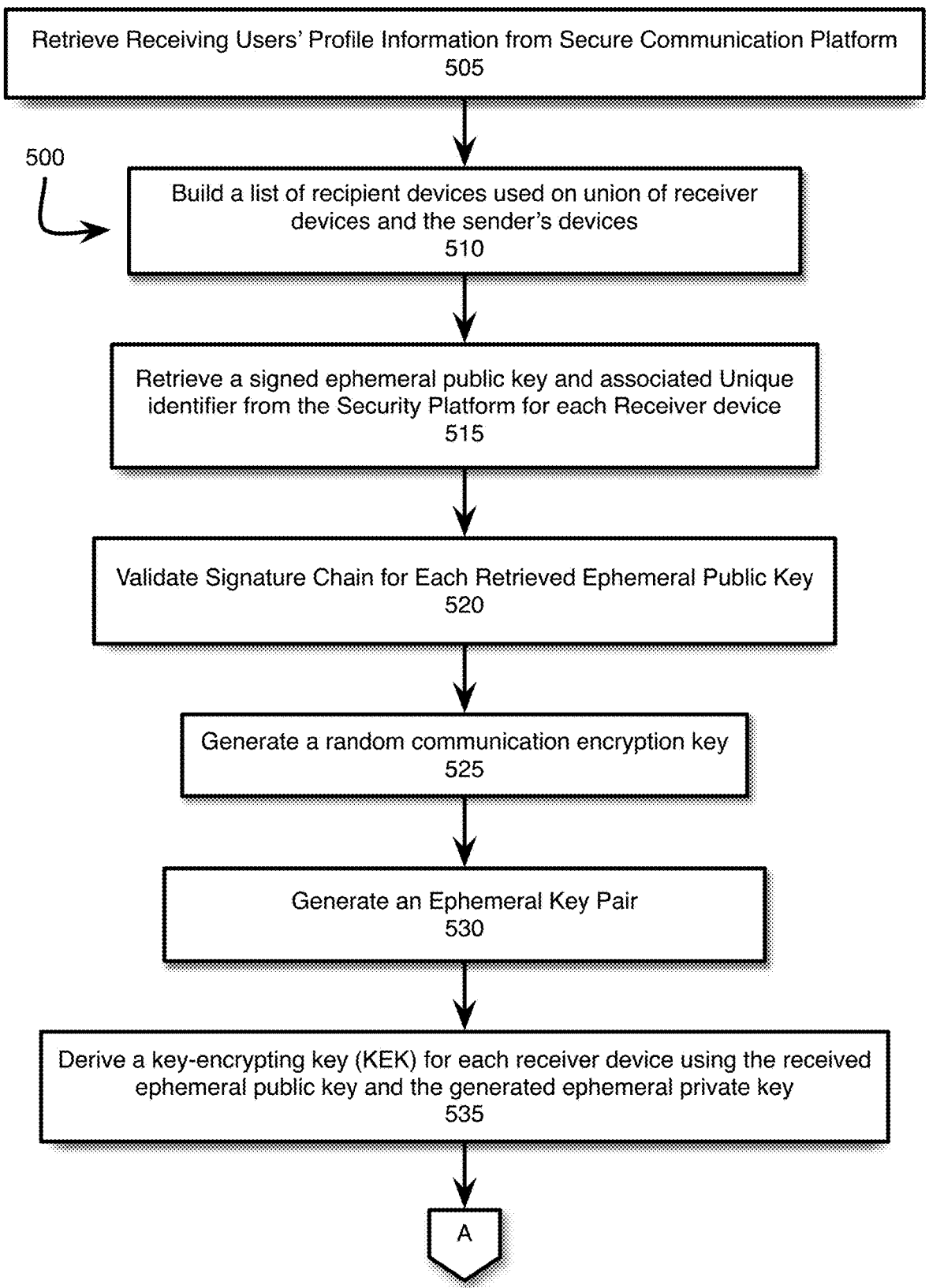
FIGS. 5A and 5B illustrate a process for transmitting an encrypted communication according to another aspect of the disclosure.
Figure 5B:
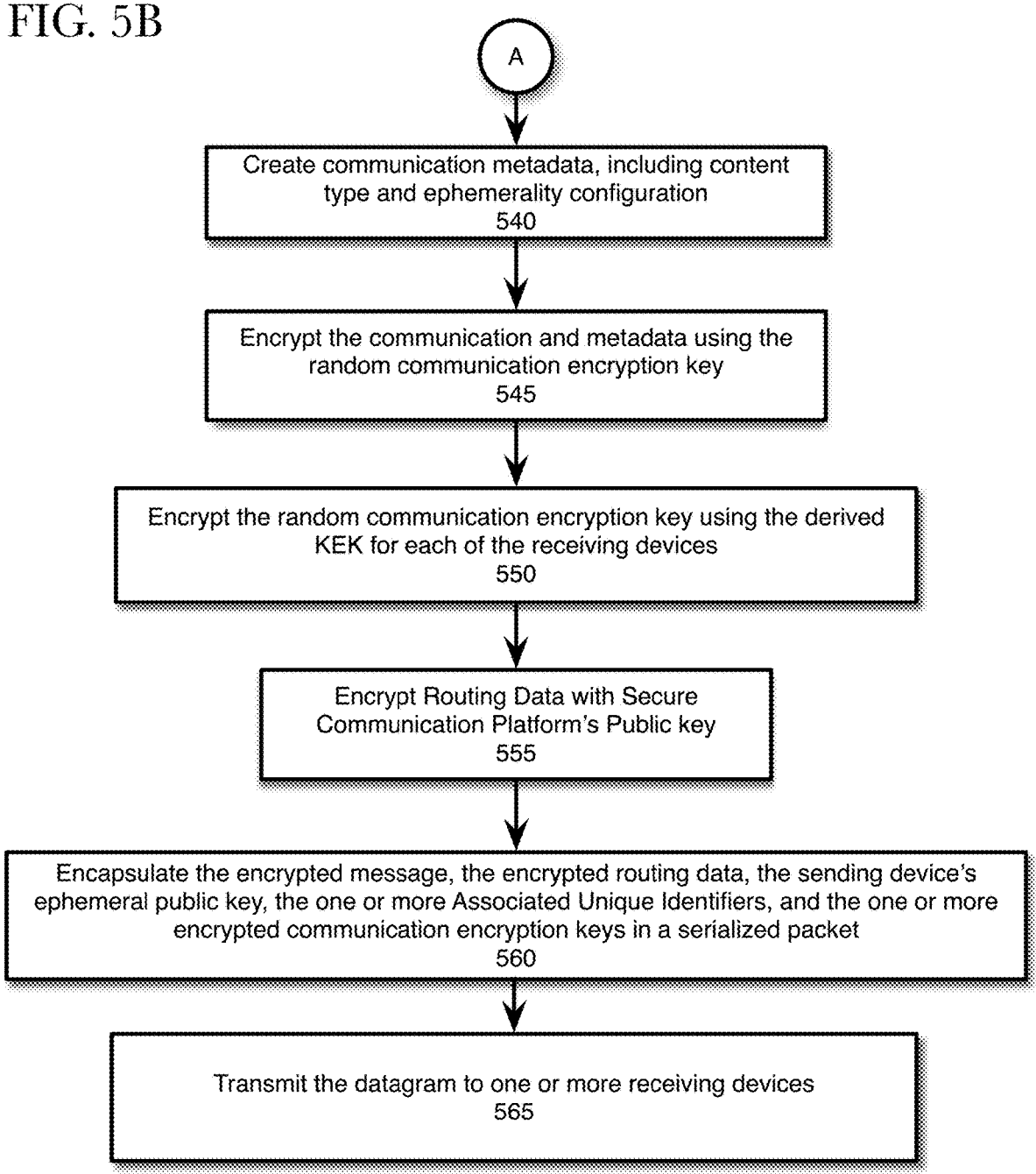

After performing the directory lookup, the user is ready to send and receive encrypted communications. The encrypted communications provided by the secure communication platform 1000 can be best understood as providing node-to-node communication rather than user-to-user communication. As suggested above, a single user may have secure communication applications executing on multiple devices. For the purposes of transmitting an encrypted communication, each instance of the secure communication application on each device would be considered a node. For example, a first user with two devices that sends a message to a second user with three devices is sending an encrypted message to four nodes—the three devices associated with the second user, and the first user's second device. FIGS. 5A and 5B illustrate a process 500 for transmitting an encrypted communication based on this principle.

In block 505, the sending device's secure communication application retrieves one or more receiving users' profile information from the secure communication platform 1000. In this regard, the sending secure communication application may request the receiving users' profile information from the secure communication platform 1000 when the sending user begins composing the communication. Alternatively, the secure communication platform 1000 may provide the receiving user's profile information in response to the directory lookup performed in FIG. 3. The user profile information includes the user's username, a network identifier, a security group identifier, a list of the recipient user's devices, the second public key for each device, and the signature of the second public key for each device. Next, the sending secure communication application builds a list of recipient devices based on a union of the receiving user devices and the sender's devices in block 510. In block 515, the sending secure communication application retrieves a signed ephemeral public key, and its associated unique identifier, from the secure communication platform 1000 for each of the recipient devices. According to some examples, the signed ephemeral public key and the associated unique identifier may be obtained along with the receiving users' profile information. In block 520, the sending secure communication application validates the signature chain for each ephemeral public key received from the secure communication platform. In this regard, the signature of the ephemeral public key is authenticated according to a signature verification algorithm, such as ECDSA, using an application public signing key. Next, a signature of the application public signing key is verified using the user public signing key; finally, the username corresponds to an expected user identity. If the signature chain is invalid, the secure communication application may request the one or more receiving users' profile information from the secure communication platform. Alternatively, the secure communication application may discard the communication and refuse to communicate with the one or more recipient devices with the invalid signature chain. If the signature chain is valid, then the secure communication application continues preparing the communication to send to the one or more receiver devices.

In block 525, the sending secure communication application generates a random communication encryption key. In preferred examples, the random communication encryption key is a 256-bit key derived from a first set of pseudorandom bytes derived from a sending client's device. In alternative examples, the random communication encryption key is generated by applying a key derivation function (e.g. HKDF) to the first set of pseudorandom bytes derived from a sending client's device. The first set of pseudorandom bytes may be derived from ephemeral environmental noise obtained from device drivers and other kernel operations. For example, data from the one or more sensors (e.g., an accelerometer, a Global Positioning Satellite (GPS) system, a magnetometer, a proximity sensor, an ambient light sensor, a moisture sensor, and a gyroscope) may be used as the first set of pseudorandom bytes.

In block 530, the sending secure communication application generates an ephemeral key pair. Preferably, the ephemeral key pair is generated according to ECC. In block 535, the sending secure communication application calculates a key-encrypting key (KEK) for each receiver device. The key-encrypting key is calculated by deriving a shared secret using the ephemeral private key the sending secure communication application generated in block 525 and the receiving node's ephemeral public key received from the secure communication platform 1000. In preferred examples, the shared secret is derived according to Diffie-Hellman. The shared secret and the recipient device's application identifier are inputted into a key derivation function to derive the key-encrypting key. By encrypting the random communication encryption key with the key-encrypting key, the encrypted communication is effectively bound to the receiver's secure communication application and device. This improves security by allowing only the recipient device to access the communication. That is, a receiver would not be able to transfer the communication from one device to another and still be able to decrypt the message since the keys used to generate the key-encrypting key are unique to the specific installation of the secure communication application. Block 535 may be repeated for each of the one or more receivers' devices.

After calculating the key-encrypting key for each of the one or more receivers' devices, the sending secure communication application may create metadata for the communication in block 540. The metadata includes at least one of a content type and ephemerality configuration. Content type may identify whether the communication is a text message, file transfer, voice call, video call, etc. Ephemerality configuration includes the TTL value and the BOR feature (e.g. enabled/disabled). In block 545, the sending secure communication application encrypts the communication and metadata using the random communication encryption key. In preferred examples, the communication is encrypted via a symmetric encryption algorithm using the random communication encryption key. In block 550, the communication key is encrypted using the derived KEK for each of the recipient devices. In block 555, the sending secure communication application encrypts routing data with a public key belonging to secure communication platform 1000. In this regard, the public key may be embedded in the secure communication application. Alternatively, the secure communication platform 1000 may provide a public key to the secure communication application. In this context, routing data includes at least one of the username for each of the one or more receiver devices, a network identifier for each of the usernames, and a security group identifier for each of the usernames. In block 560, the sending secure communication application creates a serialized packet that includes the encrypted communication, the encrypted routing data, the ephemeral public key that the sender's secure communication application generated in block 530, the one or more unique identifiers for the receiver's public key(s) received from secure communication platform, and the one or more encrypted communication encryption keys. In block 570, the sending secure communication application transmits the serialized packet to the secure communication platform 1000 for distribution to the one or more receiver devices. In this way, the secure communication platform 1000 receives a single packet and distributes the single packet to the one or more receiver devices.

Figure 6:
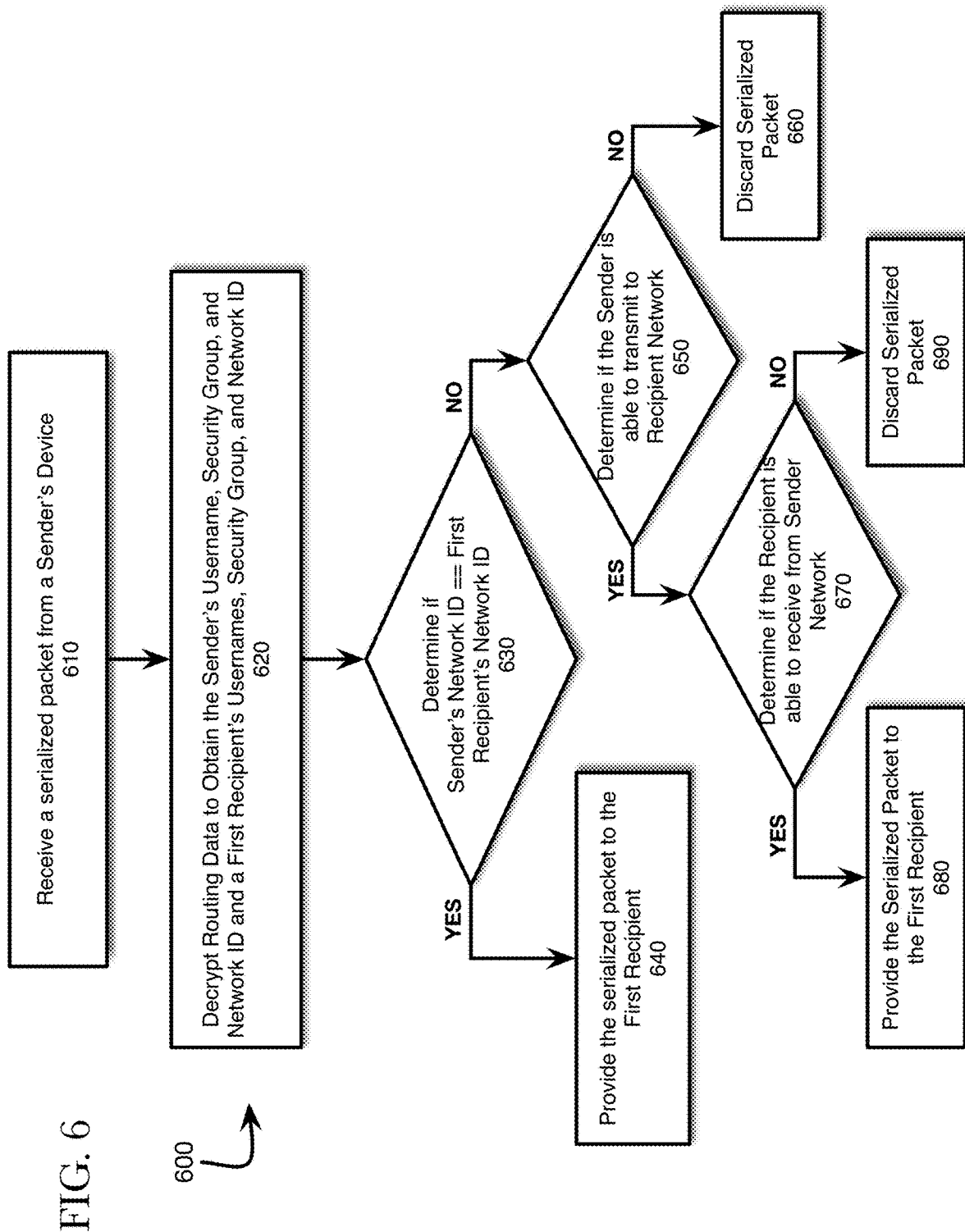
FIG. 6 shows a process for routing a secure communication from a first secure communication network to a second secure communication network.

Upon receiving an encrypted communication, secure communication platform 1000 must determine to whom to route the message. FIG. 6 illustrates a process 600 according to one aspect of the disclosure for routing the received encrypted communication to a recipient.

In block 610, process 600 begins with secure communication platform 1000 receiving a serialized packet from a sender device. In block 620, secure communication platform decrypts the routing data contained in the serialized packet received from the sender device. In preferred examples, secure communication platform 1000 decrypts the routing data with a private key to obtain the sender's username, the sender's security group identifier, the sender's network identifier, a first recipient's username, a first recipient's security group identifier, and a first recipient's network identifier.

In block 630, secure communication platform 1000 determines if the sender's network identifier and the first recipient's network identifier are equivalent. If the sender's network identifier and the first recipient's network identifier are the same, then secure communication platform determines that the first sender and the first recipient are in the same secure communication network and the serialized packet is provided to the first recipient in block 640. Providing the serialized packet may include transmitting an alert, such as a push notification, to the first recipient. In alternative examples, providing the packet to the first recipient may include pushing the serialized packet to the first recipient's device. If, however, the recipient's network identifier is different than the sender's network identifier, process 600 proceeds to block 650.

In block 650, secure communication platform 1000 determines if the sender is permitted to transmit to the first recipient's network. In preferred examples, determining whether the sender is permitted to transmit to the first recipient includes checking a first set of permissions associated with the sender's security group. For example, the first set of permissions may be reviewed to determine whether the sender's security group is permitted to transmit to the network identifier associated with the recipient. In another example, the first set of permissions may be reviewed to determine whether the sender's security group is permitted to transmit encrypted communications off network. That is, the secure communication platform determines whether the sender is allowed to transmit encrypted communications to the second secure communication networks based on the first set of permissions. If the first set of permissions do not allow the sender to transmit encrypted communications to the second secure communication network, secure communication platform 1000 discards the serialized packet in block 660. In some examples, secure communication platform may notify the sender that he or she is not permitted to transmit to other networks. For example, secure communication platform may provide a message to the sender's secure communication application to indicate that the sender does not have permission to transmit to users on other networks.

When the first set of permissions permits the sender to transmit encrypted communications to other networks, secure communication platform 1000 determines whether the first recipient is permitted to receive encrypted communications from the other secure communication networks in block 670. This may include checking a second set of permissions to determine whether the first recipient's security group is permitted to receive encrypted communications from first secure communication network. For example, the second set of permissions may indicate that the recipient is permitted to receive communications originating from the network identifier associated with the sender. Alternatively, the second set of permissions may not permit the recipient to receive communications from other secure communication networks. When the second set of permissions do not permit the recipient to receive encrypted communications from the sender's network, secure communication platform 1000 discards the serialized packet. Additionally, secure communication platform 1000 may provide an indication to the sender that the first recipient is unavailable.

However, when the second set of permissions allow the second user to receive encrypted communications from secure communication network with a different network identifier, secure communication platform 1000 provides the serialized packet to the first recipient in block 680. Providing the serialized packet to the first recipient may include placing the serialized packet in the first recipient's queue and providing a push notification, or some other indication, to the first recipient that a new communication has been received. In other examples, secure communication platform may push the serialized packet directly to the first recipient.

As noted above, a sender may address a serialized packet to one or more recipients. Accordingly, process 600 may be repeated by the secure communication platform for each of the one or more recipients included in serialized packet.

Figure 7:
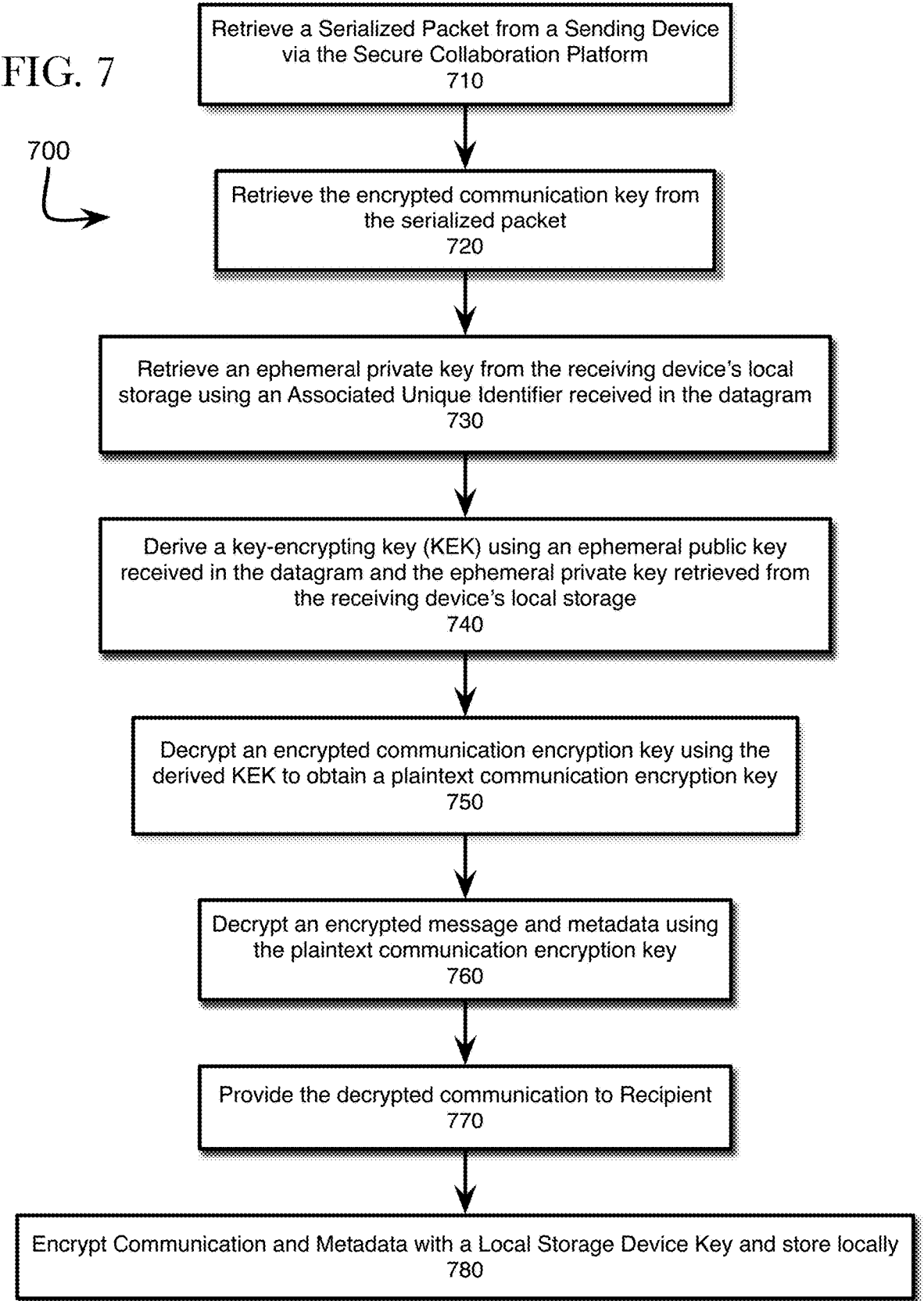
FIG. 7 illustrates a process for receiving and decrypting an encrypted communication according to one example of the disclosure.

After the secure communication platform has provided each of the one or more recipient devices with a notification of the new communication, each of the one or more recipient devices' secure communication applications may contact the secure communication platform to obtain the new communication. FIG. 7 illustrates a method 700 for decrypting an encrypted communication on a recipient device.

In block 710, a recipient device receives a serialized packet from a sending device. As noted above, this may include retrieving the serialized packet from the secure communication platform in response to receiving an alert or notification. Alternatively, retrieving the serialized packet may include receiving the serialized packet directly from the sending device, for example, via a peer-to-peer protocol. In order to decrypt the received communication, the recipient must identify the appropriate key material in the serialized packet. The first time a recipient device receives a communication from a sender, the recipient device may obtain information about the sender from the secure communication platform. This information may include an application identifier of the sending device, a username, and user profile information of the sender. The recipient device may store this information locally, preferably encrypted, for subsequent communication exchanges.

After obtaining the communication and information about the sender, the recipient's secure communication application uses its application identifier to retrieve the encrypted communication key from the serialized packet in block 720. Also in block 720, the recipient's secure communication application may also recover the unique identifier of the recipient device's ephemeral key pair from the received serialized packet. In block 730, the receiving node's secure communication application uses the unique identifier to identify and retrieve the ephemeral private key from a local storage that corresponds to the ephemeral public key used by the sending device to derive the KEK. According to some examples, the receiving device's secure communication application may decrypt the ephemeral private key retrieved from local storage using the receiving device's local storage device key. Next, the secure communication application on the receiving device derives the key-encrypting key in block 740. Specifically, the receiving device calculates a shared secret using the recipient device's ephemeral private key and the sending device's ephemeral public key. The shared secret and the receiving device's application identifier are inputted to a key derivation function to derive the key-encrypting key. In block 750, the recipient device's secure communication application decrypts the encrypted communication encryption key. In block 760, the decrypted communication encryption key is used to decrypt the message and the metadata. As noted above, metadata may include a TTL or BOR value, which the recipient's secure communication application will enforce as discussed in greater detail below. In block 770, the recipient device's secure communication application provides the decrypted communication to the user. Providing the decrypted message to the user may include, for example, displaying a text message, reproducing a call (e.g. audio or video), and/or downloading a file. In block 780, the communication may be encrypted with the receiving device's local storage device key and stored in a local storage on the receiving device.

Figure 8:
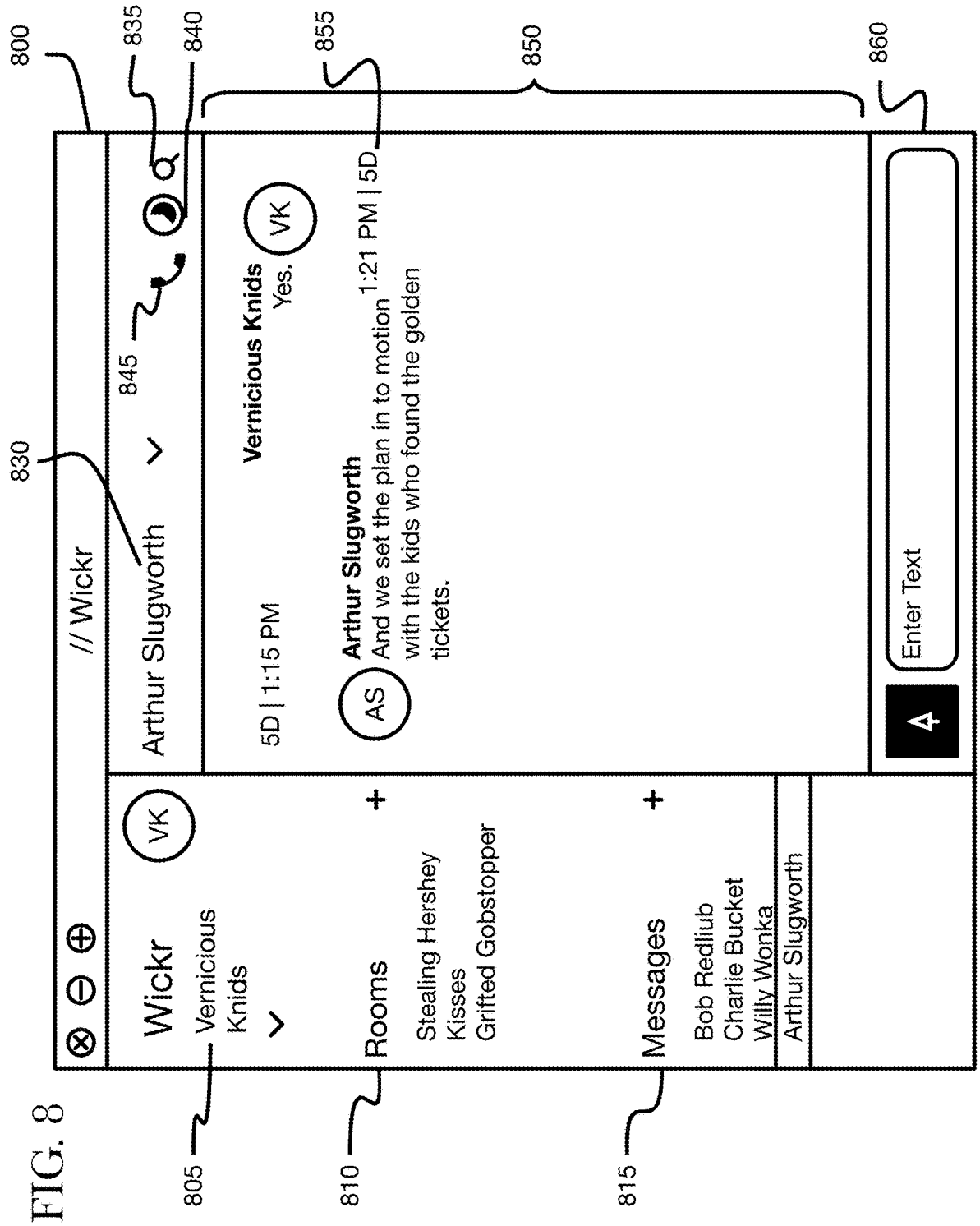
FIG. 8 shows an example of an interface for an end-to-end encrypted communication between two users

Turning to FIG. 8, an example of a desktop interface 800 for the secure communication application provided by the secure communication platform is illustrated. The interface 800 displays user information in field 805. In this regard, interface 800 belongs to Vernicious Knids as indicated by field 805. Field 810 displays the secure chat rooms that the user is participating in, while field 815 illustrates the one-to-one communications of the user. As illustrated, the Arthur Slugworth name is highlighted, indicating that a one-to-one communication with Arthur Slugworth is displayed. This is also displayed in the header field 830, which displays the name of the other user. If a secure chat room was selected, header field 830 may display the name of the secure chat room. Additionally, interface 800 may include a search field 835, the TTL status in field 840, and a telephone icon 845 for voice and video calling. Search field 835 provides users with the ability to perform a text search for communications made in interface 800. The TTL status field 840 allows a user to change the expiration time for messages before they are sent. The telephone icon 845 permits the user to participate in an encrypted audio or video call. Interface 800 also includes a text field 850, which displays incoming and outgoing communications. Text field 850 may also include a timestamp of the message and a countdown time until a message will disappear in field 855. Finally, interface 800 includes an input 860 to allow the user to enter text and/or upload files.

Figure 9:
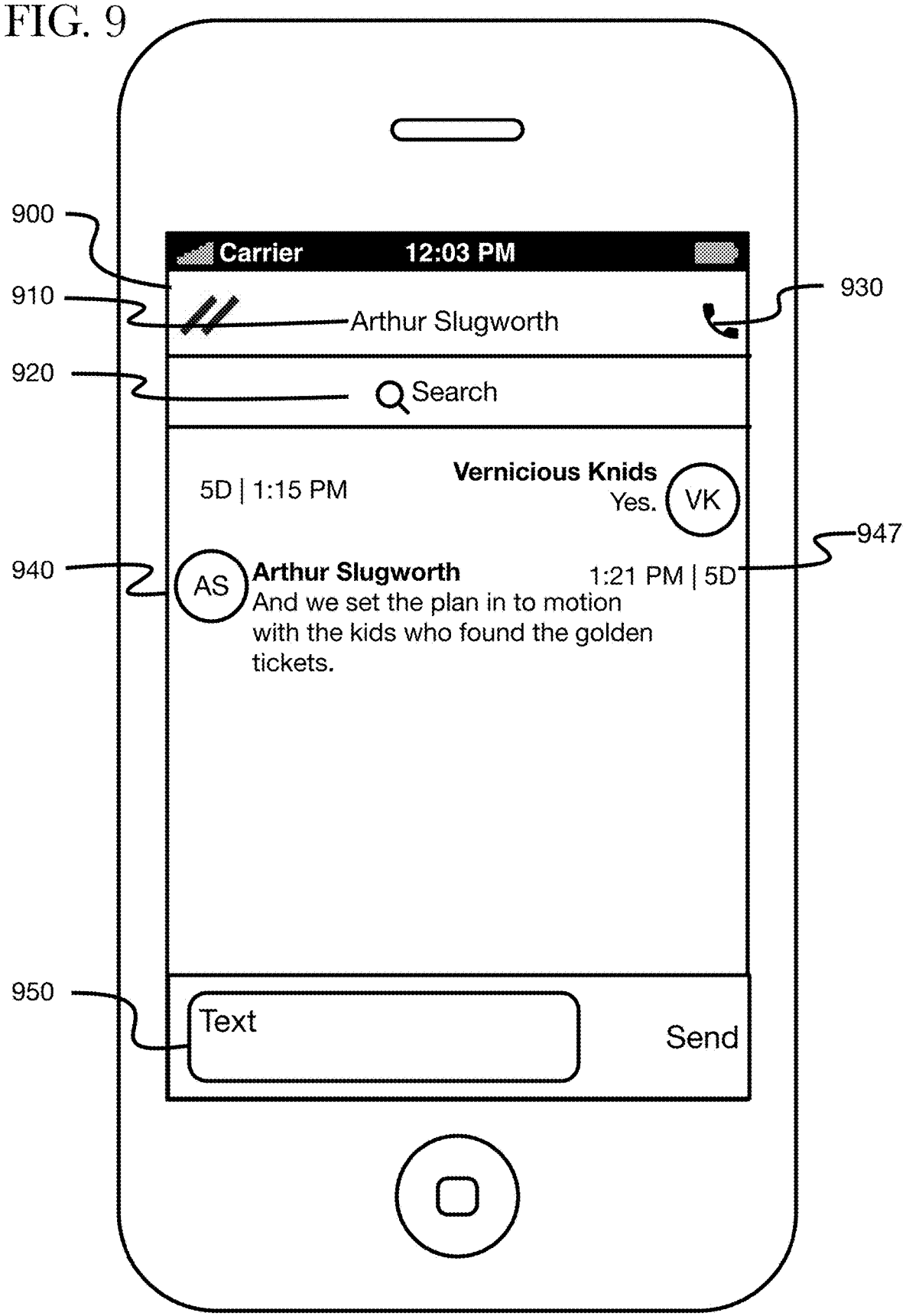
FIG. 9 shows an example of a mobile interface for end-to-end encrypted communications between a first and second user.

As noted above, a user may have the secure communication application installed on more than one device. As FIG. 8 shows an example of a desktop interface, FIG. 9 shows an example of a mobile interface 900 of a secure communication application. Similar to the desktop interface, mobile interface 900 includes a header field 910. When the user is participating in a secure chat room, the title of the secure chat room will be displayed. Similarly, the name of the other participant will be shown when the user is participating in a one-to-one communication. Interface 900 may also include a search field 920 to provide the user with the ability to perform a text search. Additionally, mobile interface 900 may also include a telephone icon 930 that allows the user to participate in an encrypted voice or video call. Mobile interface 900 includes a text field 940, which displays incoming and outgoing communications. Like the text field for the desktop interface, text field 940 also displays a timestamp and an expiration timer for each communication in field 947. Lastly, mobile interface 900 may include an input 950 for a user to enter text and/or upload files.

Figure 10:
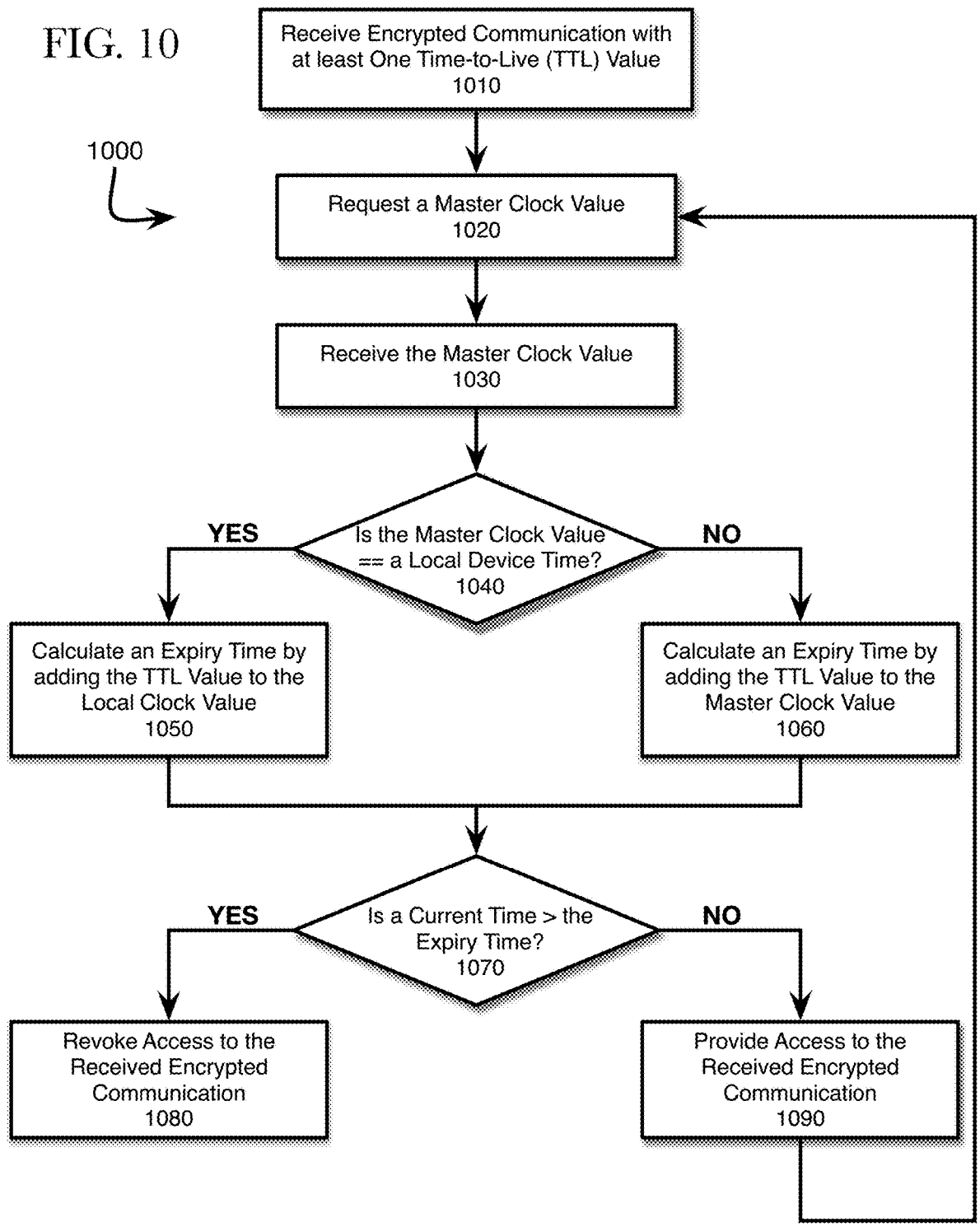
FIG. 10 illustrates a process for enforcing a time-to-live value (TTL) on a second secure communication network on a secure communication received from a first secure communication network.

As noted above, the secure communication platform may allow senders to control how long a recipient can access a communication by including a TTL value with the encrypted communication. This includes communications received on a second secure communication network from a user on a first secure communication network. FIG. 10 shows a process 1000 for enforcing a TTL value on an encrypted communication.

In block 1010, an encrypted communication with at least one TTL value is received on a recipient device from a sender. After decrypting the communication and metadata, which includes the TTL value, in accordance with the techniques described above, the secure communication application on the recipient device requests a master clock value in block 1020. The request for the master clock value may be made to secure communication platform 1000. Alternatively, the request for the master clock value may be transmitted to a trusted time server. In block 1030, the secure communication application receives a response that includes the master clock value. The response may include a signature, a hash, or some other value for the secure communication application to validate the response. Accordingly, the recipient's secure communication application may verify the signature to ensure that the master clock value has not been tampered with. In block 1040, the secure communication application determines whether the master clock value is substantially equal to the local device time. In this regard, determining whether the master clock value is substantially equal to the local device time accounts for differences in time zones between the local device and the source of the master clock value, as well as any delays in network transmission. If the master clock value and the local device time are substantially equal, the secure communication application determines an expiry time by adding the TTL value to the local clock value. Alternatively, the expiry time may be determined by adding the TTL value to a timestamp of when the encrypted communication was received at the secure communication application. When the master clock value and the local device time are significantly different, the secure communication application sets an expiry time by adding the TTL value to the received master clock value. Significantly different in this context means a difference between the times that cannot be attributed to a reasonable delay. For example, a difference of a few hours would be considered a significant difference and could be considered an attempt to circumvent the TTL value. Once the expiry time is calculated, it may be encrypted and stored locally on the recipient's device.

Regardless of how the expiry time is calculated, the secure communication application determines whether the current time is greater than the expiry time in block 1070. Again, the secure communication application may request the master clock value from the secure communication platform or a trusted time server to determine the current time. A comparison may be made between the master clock value and the local device time. When the two values are substantially the same, the secure communication application will use the local device time as the current time value. However, if there is a significant difference between the master clock value and the local device time, the master clock value will be used to determine whether the current time is greater than the expiry time. If the current time is greater than the expiry time, access to the encrypted communication is revoked in block 1080. Revoking access to the encrypted communication may include revoking the keys necessary to decrypt the communication, deleting the communication, or a combination thereof.

When the current time is less than the expiry time, the secure communication application provides the recipient with access to the encrypted communication in block 1090. Providing access to the communication may include decrypting the communication and providing the communication to the recipient. Periodically, the secure communication application may request a master clock value to determine whether the communication has expired. In this regard, the actions in blocks 1020, 1030, 1040, and 1070 may be repeated as necessary. Since the expiry time has already been calculated, the steps of blocks 1050 and 1060 may be skipped. Using the techniques described above, the secure communication platform can enforce TTL values on communications as they travel between different networks.

The above-described examples provide a technical solution that provides users on different secure communication networks with the ability to exchange encrypted communications with a high degree of trust. In particular, the unified user database distributes recipients' keys and authenticates the identity of the sender to the recipient secure communication network.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method for performing a directory lookup for federated messaging, the method comprising:
   receiving, at a first server from a first user device belonging to a first secure communication network, a first identifier of a second user associated with a second device and belonging to a second secure communication network, wherein the first user device is associated with a first security group identifier and the second device is associated with a second security group identifier;
   determining, by the first server, that the first user device is permitted to communicate with the second secure communication network based on a first set of permissions associated with the first security group identifier indicating that the first user device is permitted to communicate with the second secure communication network;
   determining, by the first server, whether the second user is permitted to communicate with the first secure communication network based on a second set of permissions associated with the second secure communication network;
   when the second user is permitted to receive communications from the first secure communication network, providing, from the first server to the first user device, profile information of the second user.

2. The method of claim 1, wherein the determining whether the second device is permitted to receive communications from the first secure communication network comprises:
   determining whether a second set of permissions associated with the second security group identifier permits the second device to receive communications from the first secure communication network.

3. The method of claim 1, comprising:
providing, from the first server, an indication to the first user device that the second user is unavailable when the first user device is not permitted to transmit communications to the second communication network.

4. The method of claim 1, comprising:
providing, from the first server, an indication to the first user device that the second user is unavailable when the second device is not permitted to receive communications from the first communication network.

5. The method of claim 1, wherein the first identifier is at least one of a phone number, an email address, and a native identifier.

6. A system for performing a directory lookup for federated messaging, the system comprising:
an interface configured to receive a first identifier of a second user associated with a second device and belonging to a second secure communication network from a first user device belonging to a first secure communication network, wherein the first user device is associated with a first security group identifier and the second device is associated with a second security group identifier;
a processor configured to determine whether that the first user device is permitted to communicate with the second secure communication network based on a first set of permissions associated with the first security group identifier indicating that the first user device is permitted to communicate with the second secure communication network, determine whether the second user is permitted to communicate with the first secure communication network based on a second set of permissions associated with the second secure communication network, and provide profile information of the second user to the first user device when the first user device and the second user are permitted to communicate; and
a memory coupled to the processor and configured to provide the processor with instructions for determining whether to provide the second user's profile to the first user device.

7. The system of claim 6, wherein the processor is further configured to determine whether a second set of permissions associated with the second security group identifier permits the second device to receive communications from the first secure communication network.

8. The system of claim 6, wherein the processor is configured to provide an indication to the first user device that the second user is unavailable when the first user device is not permitted to transmit communications to the second communication network.

9. The system of claim 6, wherein the processor is configured to provide an indication to the first user device that the second user is unavailable when the second device is not permitted to receive communications from the first communication network.

10. The system of claim 6, wherein the first identifier is at least one of a phone number, an email address, and a native identifier.

11. A non-transitory computer-readable medium comprising instructions that when, executed by at least one processor, perform the steps of:
receiving, at a first server from a first user device belonging to a first secure communication network, a first identifier of a second user associated with a second device and belonging to a second secure communication network, wherein the first user device is associated with a first security group identifier and the second device is associated with a second security group identifier;
determining, by the first server, whether that the first user device is permitted to communicate with the second secure communication network based on a first set of permissions associated with the first security group identifier indicating that the first user device is permitted to communicate with the second secure communication network;
when the first user device is permitted to transmit communications to the second communication network, determining, by the first server, whether the second user is permitted to communicate with the first secure communication network based on a second set of permissions associated with the second secure communication network;
when the second user is permitted to receive communications from the first communication network, providing, from the first server to the first user device, profile information of the second user.

12. The non-transitory computer-readable medium of claim 11, wherein the determining whether the second device is permitted to receive communications from the first secure communication network comprises:
determining whether a second set of permissions associated with the second security group identifier permits the second device to receive communications from the first secure communication network.

13. The non-transitory computer-readable medium claim 11, comprising:
providing, from the first server, an indication to the first user device that the second user is unavailable when the first user device is not permitted to transmit communications to the second communication network.

14. The non-transitory computer-readable medium claim 11, comprising:
providing, from the first server, an indication to the first user device that the second user is unavailable when the second device is not permitted to receive communications from the first communication network.

15. The non-transitory computer-readable medium claim 11, wherein the first identifier is at least one of a phone number, an email address, and a native identifier.

* * * * *